(3690714)
Jan. 21, 1975 S. E. FARMER Re. 28,309
ROLL CLAMP
Original Filed April 10, 1969
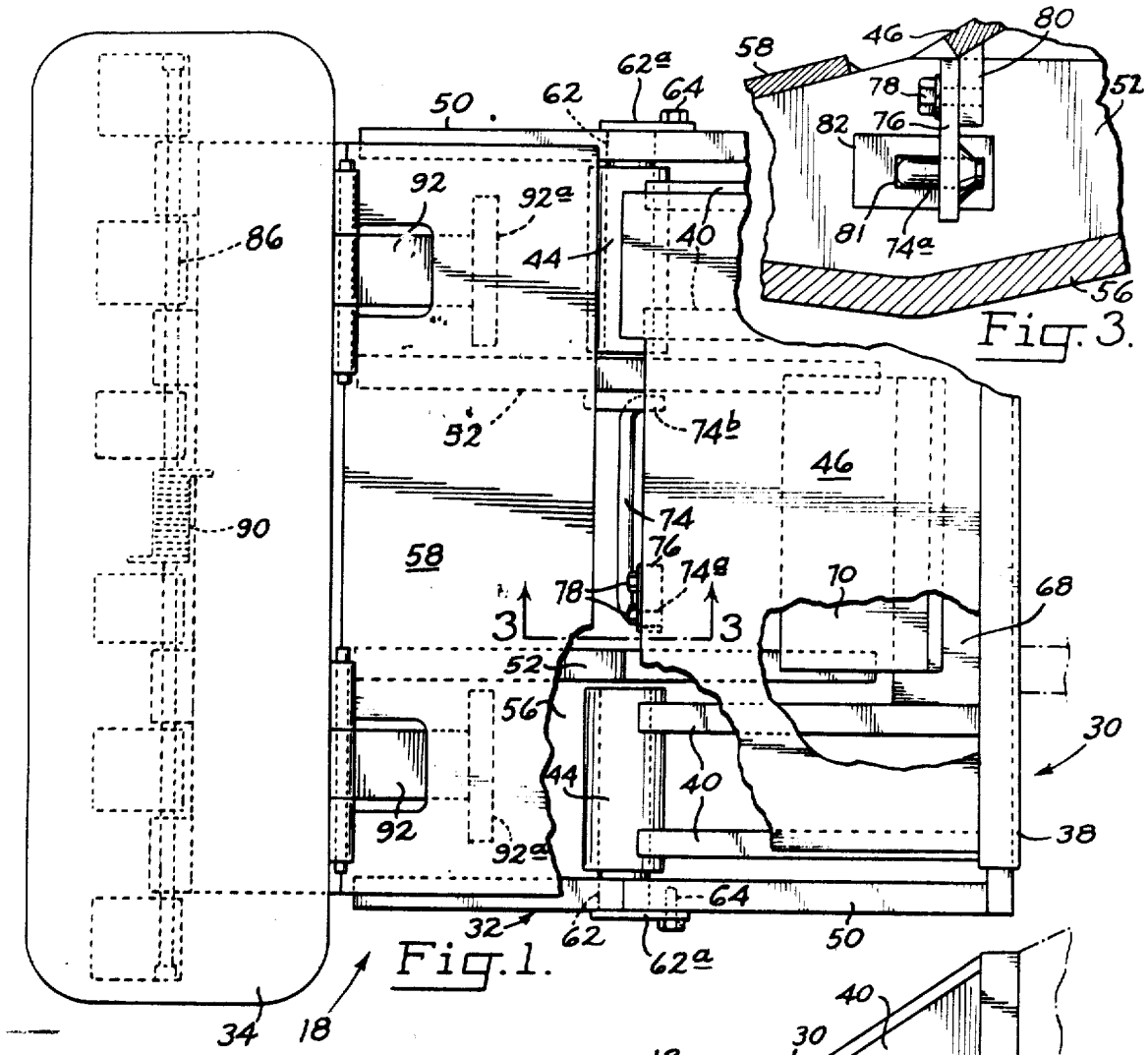
Fig. 3.
Fig. 1.
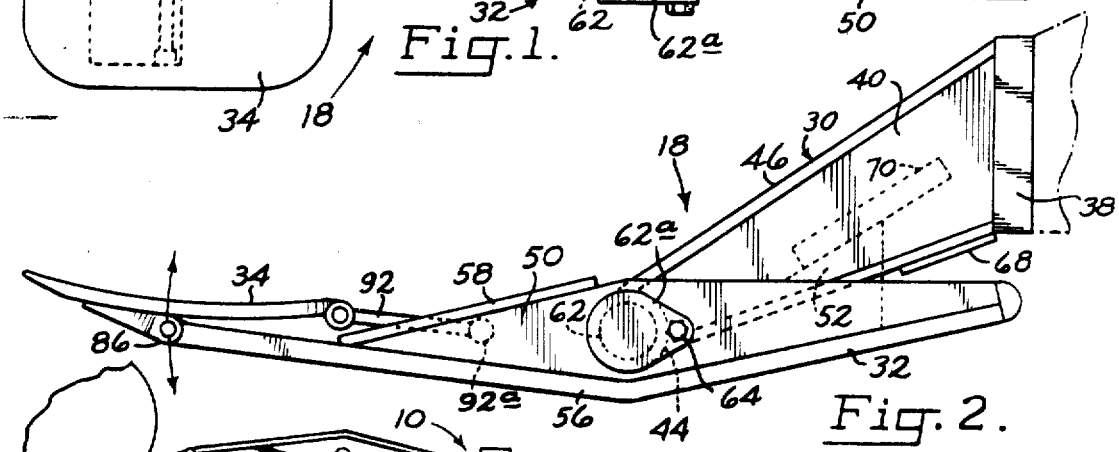
Fig. 2.
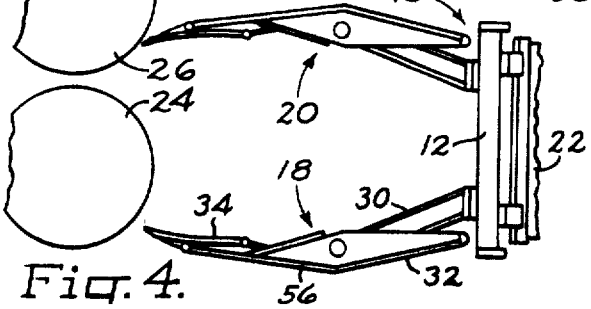
Fig. 4.
Stanley E. Farmer
INVENTOR
BY
Kolisch & Hartwell
Attys United States Patent Office Re. 28,309
Reissued Jan. 21, 1975

28,309
ROLL CLAMP

Stanley E. Farmer, Gresham, Oreg., assignor to Cascade Corporation, Portland, Oreg.

Original No. 3,690,714, dated Sept. 12, 1972, Ser. No. 67,235, Aug. 26, 1970, which is a continuation of abandoned application Ser. No. 814,919, Apr. 10, 1969. Application for reissue Mar. 7, 1973, Ser. No. 338,838
Int. Cl. B66f *9/18*
U.S. Cl. 294—88 6 Claims

Matter enclosed in heavy brackets [ ] appears in the original patent but forms no part of this reissue specification: matter printed in italics indicates the additions made by reissue.

ABSTRACT OF THE DISCLOSURE

A roll clamp comprising a pair of concavely curved pads for clamping onto opposite sides of a roll. A pair of opposed arm structures extending rearwardly from the pads toward a frame support the pads in spaced opposed and facing relationship. The arm structures are movable toward and away from each other on the frame, whereby the pads may be brought against opposite sides of a roll. At least one arm structure includes an arm base which is mounted on the frame, a forward arm section, and means pivotally mounting the forward arm section on the arm base enabling it to swing in each of opposite directions until reaching defined limit positions. The pivot means is located toward said frame from said pads, and from the load center of any roll clamped by the pads. A spring biases the forward arm section to place it in an intermediate at rest position between these two limit positions.

This application is a continuation of applicant's prior copending application Ser. No. 814,919, filed Apr. 10, 1969, now abandoned.

This invention relates to a roll clamp, such as might be used with a lift truck or other load-handling agency.

In handling rolls, such as heavy paper rolls, it is conventional to use a roll clamp having a pair of opposed, relatively movable arms with pads thereon which may be clamped against opposite sides of the load and then maneuvered as required to move the load. The roll clamp may be mounted on a vehicle such as a lift truck, with the clamping arms projecting forwardly from the truck. In using the truck, the operator must move the arms away from each other a sufficient distance to enable a roll to fit between the pads on the arms and then drive the vehicle forwardly to place the pads on either side of a roll. The clamping arms and pads are then moved toward each other to grasp the roll.

The spacing of the arms, and positioning of the pads to obtain proper straddling relationship are generally matters of approximation for the driver, and the accuracy of such are dependent on the driver's skill. If the driver does not judge the arm and pad spacing and positioning with respect to the roll correctly, the forward ends of the arms and pads might scrape the roll being picked up, or adjacent rolls, with resultant roll damage.

This invention is bottomed on the concept of permitting limited swinging in the forward end of a clamping arm on which a pad is mounted, against the biasing of a biasing means, whereby an operator is not required to exactly laterally space and relatively position the arms and pads with respect to a roll prior to picking it up. Obviously, this results in reduced roll damage, and is a factor in promoting faster roll handling.

Thus, a general object of the invention is to provide, in a roll clamp a novel clamping arm supporting a roll-engaging pad, which arm features a swingable forward section.

Another object is to provide such a roll clamp where the forward section of the clamping arm is permitted to swing outwardly away from an opposed clamping arm toward a defined limit position, against the urging of biasing means which tends to maintain the section in an at rest position where the section is disposed inwardly of the position it has on reaching such limit position.

Yet another object is to provide such a roll clamp where the forward seection of the clamping arm is permitted to swing inwardly toward an opposed clamping arm toward a defined limit position, against the urging of the biasing means which tends to maintain the section in its at rest position.

More specifically, an object is to provide, in a roll clamp, an adjustable clamping arm which includes an arm base that has a fixed position relative to a frame in the clamp with the arm occupying any given adjusted position, and a forward arm section which is pivotally mounted on the arm base with its forward end permitted swinging movement between a pair of limit positions. Means defining the limit positions is interposed between the arm base and forward arm section, in a region disposed rearwardly of the pivot axis for the forward arm section. With the limit means positioned rearwardly of the pivot axis a well-balanced and easily handled arm is provided.

With the preferred embodiment of the invention, both of a pair of opposed clamping arms have pivotally mounted and biased forward arm sections, as described.

Another factor to consider is that at times it is desirable to use the arms of the roll clamp backhandedly, i.e., as an agency for moving a roll by moving the outer, or back side of an arm outwardly against the roll.

Thus, a further object of the invention is to provide such a roll clamp where the forward section of the clamping arm is permitted only limited swinging movement inwardly toward an opposed clamping arm to enable it to be used backhandedly to move rolls.

These and other objects and advantages will become more fully apparent as the following description is read in conjunction with the drawings, wherein:

FIG. 1 is a side view of a clamping arm for a roll clamp constructed in accordance with an embodiment of the invention;

FIG. 2 is a top view of the arm;

FIG. 3 is a cross-sectional view, somewhat enlarged, taken generally along the line 3—3 in FIG. 1; and FIG. 4 is a plan view, on a somewhat smaller scale, illustrating a roll clamp as contemplated in an attachment for a lift truck.

Referring now to the drawings, and first more specifically to FIG. 4 at 10 is indicated generally a roll clamp in the form of a lift truck attachment, which includes a frame 12 and a pair of opposed clamping arms, or arm structures, 18, 20. The roll clamp is shown mounted on the carriage 22 of a lift truck, with the clamping arms projecting forwardly from the lift truck which conventionally has such carriage carried in a forwardly disposed position as part of a mast assembly.

Arms 18, 20 are each mounted on the frame for movement in a lineal path toward and away from the opposite arm. Such movement of an arm is produced by actuation of a power-operated means, such as a hydraulic motor or ram (not visible in the drawings). The clamping arms are adapted to be positioned with one on either side of a load, such as one of the paper rolls illustrated at 24, 26. With the arms straddling a load, and when they are subsequently moved toward each other, they clamp onto substantially diametrically opposite sides of the roll and on opposite sides of the load center of the roll. Once a roll has been clamped between the arms it may be maneuvered, as by lifting it or rotating it by operation of the lift truck attachment.

The arms shown are similar, and thus only one will be described in detail. Referring to arm 18 in FIG. 4, it will be seen that it includes an arm base 30 which is mounted on and projects forwardly from the frame, a forward arm section 32 which is mounted on and projects forwardly from the arm base, and a load-engaging pad 34 mounted on the forward extremity of the arm section. Arm base 30 slides along frame 12, during adjusting of the position of the arm on frame 12. With arm 18 occupying any given adjusted position on the frame, the arm base is fixed in this position.

Arm structure 18 is illustrated in greater detail in FIGS. 1 and 2. On referring to these figures, it will be seen that arm base 30 comprises an elongated base plate 38 extending along the rear extremity of the arm, to which are secured two pairs of cantilever bars 40 extending normal to the base plate. Bars 40 project forwardly from base plate 38. One pair of the bars is adjacent the upper end of base plate 38 in FIG. 1 and another pair is adjacent the lower end. A pair of elongated cylindrical bearings 44 are secured to the forward ends of bars 40, one to each pair. As is best seen in FIG. 1, the bearings are mounted with their axes aligned, and paralleling the base plate 38. A cover plate 46 is secured to the inner edges of bars 40, this cover plate facing inwardly on the attachment and toward the opposing arm.

Forward arm section 32 includes a pair of elongated, substantially parallel exterior bracing members 50, forming the top and bottom of the arm, which are positioned outwardly from opposite ends of bearings 44. Rear extremities of the bracing members overlap arm base 30. A pair of elongated, spaced-apart interior bracing members 52 parallel exterior bracing members 50, and are positioned inwardly of the inner ends of bearings 44. A plate 56 secured to the outer edges of bracing members 50, 52, forms the outer side of the forward arm section. A rectangular cover plate 58 is secured to the inner edges of bracing members 50, 52 such being located forwardly in the arm section from bearings 44.

Forward arm section 32 is pivotally mounted on the arm base, in a region toward the frame from pad 34 and from the load center of any roll clamped by the pads, by a pair of elongated journals 62 having ends projecting through accommodating bores in bracing members 50. The journals are rotatably received within cylindrical bearings 44. Each of the journals has a cap 62a joined to it, which is secured by a fastener 64 to a bracing member 50. Journals 62 and bearings 44 provide a pivot axis which the forward arm section may swing about, with such movement being either in a clockwise or a counterclockwise direction, as viewed in FIG. 2. Clockwise movement of the forward arm section moves its forward extremity toward the opposed arm in the roll clamp, and counterclockwise swinging moves the forward extremity of the arm section away from the opposed arm.

Swinging movement of forward arm section 32 in a counterclockwise direction, as viewed in FIG. 2, is limited by the rear margin, or expanse, of plate 56, which forms the outer side of the arm, coming into contact with the outer face of a bearing pad 68 secured to cantilever bars 40 of the arm base. Swinging of the forward arm section in a clockwise direction, as viewed in FIG. 2, is limited by a stop member 70 coming into contact with the inner face of this bearing pad. The stop member is secured in place on the forward arm section, as by welding it to the edges of bracing members 52. The outer face of pad 68 and the rear margin of plate 56 thus constitute a limit means limiting outward swinging movement of the forward extremity of arm section 32, and the stop member and the inner face of the bearing pad constitute another limit means limiting inward swinging movement of the forward extremity of arm section 32.

Biasing means, in the form of a torsion bar 74 (reference is made to FIGS. 1 and 3) biases the arm section to a position intermediate the limit positions just described, which position constitutes an at rest position for the forward arm section. The torsion bar is substantially aligned with the pivot axis provided by bearings 44 and journals 62. The torsion bar is mounted in place by securing turned over end portion 74a of the bar as by welding to a plate 76, this plate being secured by fasteners 78 to a pad 80 which is joined to cover plate 46 of the arm base. A turned over end 74b at the opposite end of the torsion bar is fitted into a notch 81 in a pad 82 which is secured, as by welding, to one of the bracing members 52 of the forward arm section.

As is best seen in FIGS. 1 and 2, load-engaging pad 34 has an elongated, arcuate configuration, with its inner, or load-engaging, surface being concave. The pad is mounted on the forward extremity of forward arm section 32 through a pivotal connection 86 which provides a pivot axis extending substantially parallel to the pivot axis for the forward arm section. A spring 90, illustrated in dashed outline in FIG. 1, is interposed between the pad and the arm section to resist movement of the pad from its at rest position, as illustrated in FIG. 2. As is seen in FIG. 4 the pad is supported on the arm structure in spaced opposed relation to the pad on the other arm structure, with their concave surfaces facing each other.

Pivotally connected to the rear margin of pad 34 are a pair of spaced-apart, T-shaped limit members 92, which project through cutouts in cover plate 58 on the forward arm section. The cutouts are narrower than the length of the cross bar 92a at the head of each T-shaped member. The cross bar for each limit member is movable loosely within the space between cover plate 58 and plate 56 on the forward arm section. Swinging of pad 34 in a clockwise direction as viewed in FIG. 2 is limited by the distance the rear margin of pad 34 may move before it contacts plate 56 on the arm section. On swinging pad 34 in a counterclockwise direction, limit members 92 move to the left in FIGS. 1 and 2, until their cross bars 92a are stopped by the convergence of cover plate 58 and plate 56, to define another limit position for the pad.

In operation, and referring specifically to FIG. 4, an operator moves the vehicle on which the roll clamp is mounted to a position adjacent the roll to be picked up, such as that shown at 24. The clamping arms and pads thereon are positioned to permit them to be advanced with the vehicle to a position on either side of the roll. As is illustrated in FIG. 4, however, the vehicle operator might misalign the clamping arms so that upon driving straight forward, the pad on the forward extremity of arm 18 would be driven into roll 24 while arm 20 would hit roll 26. With the clamping arms disclosed no damage would occur to the rolls, since the forward extremity of arm 18 may swing outwardly and away from the other arm when it comes against roll 24, permitting it to slide around one side of the roll, and the forward extremity of arm 20 may swing inwardly toward roll 24, and toward arm 18, on coming against roll 26.

When the arms are properly positioned on either side of roll 24, they are moved under power toward each other, with pads 34 moved against the sides of the roll. The forward arm section of each arm structure swings about its pivot axis to its outer limit position, and thence is clamped against a side of the roll. The roll thus is embraced by the pads on the arm structures and it may be maneuvered as desired by the operator.

Should it be desired to use an arm in the roll clamp backhandedly, the operator would maneuver the vehicle to place the outer side of the forward arm section of one of the arms adjacent such roll and then move such arm under power away from the other arm until it contacts the roll. The forward arm section swings about its pivot axis to its inner limit position and then urges the roll to move in the direction the arm is being moved.

While an embodiment of the invention has been described, it is appreciated that variations and modifications may be made without departing from the spirit of the invention.

It is claimed and desired to secure by Letters Patent:

1. In a roll clamp including a frame and a pair of opposed arm structures mounted on said frame actuatable to clamp onto a roll, said arm structures mounting at the forward extremities thereof curved clamping pads for clamping against substantially diametrically opposite sides of a roll, the improvement comprising a construction for at least one arm structure in the form of an arm base which is mounted on the frame for powered adjustable movement toward and away from the opposing arm structure to place the arm structure at different positions within a range of relatively adjusted positions with respect to the opposing arm structure for the purpose of clamping onto a roll, said arm base having a fixed position on the frame in a given adjusted position for said one arm structure within said range, a forward arm section projecting forwardly of the arm base mounting the curved clamping pad, means pivotally mounting the forward arm section on the arm base for swinging movement about a pivot axis located toward said frame from said pad and the load center of a roll clamped between the pads of the two arm structures, said pivot axis accommodating free swinging of the forward extremity of the forward arm section in the same general directions as the directions in which the arm base is movable.

first limit means interposed between the forward arm section and arm base limiting swinging movement of the forward arm section relative to said arm base in a direction away from the opposing arm structure beyond a defined first limit position for the forward arm section, and second limit means interposed between the forward arm section and arm base limiting swinging movement of the forward arm section relative to the arm base in a direction towards said opposing arm structure beyond a defined second limit position,

[The] *the* forward arm section having an at-rest position on the arm base which the arm section occupies absent holding onto a roll and with said one arm structure positioned in different positions within said range of adjusted positions, said at-rest position for the forward arm section being intermediate said first and second limit positions, the arm section in said at-rest position projecting forwardly from said frame to be in a position to engage a load, and biasing means yieldably holding said forward arm section in its said at-rest position, said forward arm section during initial positioning of the roll clamp adjacent a roll thus being afforded limited play in swinging from its said at-rest position toward one of its limit positions.

2. The roll clamp of claim 1, wherein said biasing means comprises an elongated torsion bar extending substantially along the pivot axis for said forward arm section, one end of the torsion bar being rigidly secured to said arm base and the other end being rigidly secured to said forward arm section.

3. The roll clamp of claim 1, wherein said forward arm section includes an expanse which projects from the pivot axis for the forward arm section rearwardly toward said frame and which lies adjacent rear portions of the arm base, and wherein said first and second limit means comprise means interposed between a rear portion of said expanse and a rear portion of said arm base.

4. The roll clamp of claim 3, wherein said expanse of said forward arm section lies outwardly of said arm base, and said first limit means comprises a bearing pad on said arm base contactable with an inner portion of said expanse to define the limit position.

*5. In a roll clamp including a frame and a pair of opposed arm structures mounted on said frame which may be moved relatively toward and away from each other to place them in different relatively spaced adjusted positions during the operation of clamping onto and releasing rolls, said arm structures having curved clamping pads mounted at their forward ends for clamping against substantially diametrically opposite sides of a roll, the improvement comprising*

*a construction for at least one arm structure which includes pivot means interposed between the frame and the forward end of the one arm structure in the mounting for the one arm structure, said pivot means permitting the forward end of the one arm structure and the pad mounted thereon to swing toward and away from the opposing other arm structure with said arm structures occupying a given relatively adjusted position, said swinging occurring about a pivot axis located toward said frame from said pad on said one arm structure,*

*first limit means limiting swinging movement of the forward end of said one arm structure about said pivot axis in a direction away from the opposing arm structure beyond a defined first limit position, and second limit means limiting swinging movement of the forward end of said one arm structure about said pivot axis in a direction toward said opposing other structure beyond a defined second limit position,*

*said forward end of said one arm structure having an at-rest position which it occupies absent holding onto a roll with the arm structures in a given relatively adjusted position, said at-rest position being intermediate said first and second limit positions, and*

*biasing means yieldably holding said forward end of said one arm structure in its said at-rest position, said forward end of said one arm structure thus being afforded limited play in swinging from its said at-rest position toward either of its said limit positions.*

*6. In a roll clamp including a frame and a pair of opposed arm structures mounted on said frame which may be moved relatively toward and away from each other to place them in different relatively spaced adjusted positions, the improvement comprising a construction for at least one arm structure which includes*

*a curved clamping pad pivotally mounted on the forward end of said one arm structure,*

*pivot means interposed between the frame and the forward end of the one arm structure in the mounting for the one arm structure permitting the forward end of said one arm structure and the pivotally mounted pad which it carries to swing toward and away from the opposing other arm structure with the two arm structures occupying a given relatively adjusted position, such pivot means providing for pivotal movement about a pivot axis which is located toward said frame from said pad on said one arm structure,*

*means limiting swinging movement of the forward end of said one arm structure and the pad which it carries about said pivot axis in a direction away from the opposing other arm structure beyond a defined first limit position and in a direction toward the opposing arm structure beyond a defined second limit position,*

*said forward end of said one arm structure having an at-rest position which it occupies absent holding onto a roll and with the arm structures in a given relatively*

*adjusted position, said at-rest position being intermediate said first and second limit positions, and*

*biasing means yieldably holding said forward end of said one arm structure in its said at-rest position with said forward end as held by said biasing means being afforded limited play in swinging from its said at-rest position toward either of its said limit positions.*

References Cited

The following references, cited by the Examiner, are of record in the patented file of this patent or the original patent.

UNITED STATES PATENTS

| | | | |
|---|---|---|---|
| 3,127,209 | 3/1964 | Faust et al. | 294—88 |
| 3,198,568 | 8/1965 | Mindrum | 294—88 |
| 3,180,672 | 4/1965 | Bjorklund et al. | 294—88 |

EVON C. BLUNK, Primary Examiner

B. H. STONER, JR., Assistant Examiner

U.S. CL. X.R.

214—653; 294—106